United States Patent [19]
Roberts

[11] Patent Number: 5,385,050
[45] Date of Patent: Jan. 31, 1995

[54] GAP MEASUREMENT FOR SHIM MANUFACTURE

[75] Inventor: William E. Roberts, Rolling Hills Estates, Calif.

[73] Assignee: Northrop Grumman Corporation, Los Angeles, Calif.

[21] Appl. No.: 864,976

[22] Filed: Apr. 7, 1992

[51] Int. Cl.$^6$ ............................................. G01S 11/14
[52] U.S. Cl. ................................. 73/597; 367/118; 33/783
[58] Field of Search .................. 73/597, 594, 596, 632, 73/633, 641, 760, 1; 367/118, 119, 121, 122, 127, 129; 33/606, 783; 428/328

[56] References Cited

U.S. PATENT DOCUMENTS

| | | | |
|---|---|---|---|
| 3,121,955 | 2/1964 | King | 73/597 |
| 4,161,885 | 7/1979 | Sack | 73/628 |
| 4,359,767 | 11/1982 | Sachs et al. | 367/122 |
| 4,375,900 | 3/1983 | Tachibana et al. | 367/118 |
| 4,567,766 | 2/1986 | Seiferling | 73/597 |
| 4,607,520 | 8/1986 | Dam | 73/861.28 |
| 4,649,752 | 3/1987 | Turner | 73/760 |
| 4,704,906 | 11/1987 | Churchill et al. | 73/597 |
| 4,802,371 | 2/1989 | Calderara et al. | 73/862.04 |
| 4,814,703 | 3/1989 | Carr et al. | 73/597 |
| 4,841,224 | 6/1989 | Chalupnik et al. | 33/783 |
| 4,861,643 | 8/1989 | Scollard | 428/328 |
| 5,067,250 | 11/1991 | Auweiler et al. | 33/783 |

FOREIGN PATENT DOCUMENTS

| | | | |
|---|---|---|---|
| 0063775 | 5/1980 | Japan | 33/1 P |
| 1410152 | 10/1975 | United Kingdom | 73/DIG. 4 |
| 1043489 | 9/1983 | U.S.S.R. | 33/1 P |
| 8704527 | 7/1987 | WIPO | 367/118 |

*Primary Examiner*—Hezron E. Williams
*Assistant Examiner*—Rose M. Finley
*Attorney, Agent, or Firm*—Terry J. Anderson; Karl J. Hoch, Jr.

[57] ABSTRACT

A fabrication of a shim for insertion within a gap extending in two orthogonal directions between two structural members in the building of a mechanical structure is accomplished by measuring the gap to provide a map of gap width. Variations in gap width appear in the map so as to enable machining of the shim with corresponding variations in thickness so as to fit accurately in the gap. Measurement of the gap width is attained by use of two acousto-electric transducer assemblies, each of which is constructed as an array of electrode discs produced by photolithography upon a flexible, electrically-insulating film of piezoelectric material which serves as a substrate for support of electrodes on a front surface thereof and a ground plane structure on a back surface thereof. The two transducer assemblies are secured adhesively to corresponding surfaces of structural members defining the gap, and an acoustically-transmissive gel is disposed between the two transducer assemblies. Electrical ranging circuitry is connected to the electrodes of the transducer assemblies to provide a transmitting array for generating sonic signals and a receiving array for receiving the acoustic signals produced by the corresponding transmitting electrodes disposed across the gap from the receiving electrodes. The time of flight of acoustic signals across the gap serves as a measure of the gap width for preparation of a map of the gap width to serve as a basis for construction of the shim.

26 Claims, 4 Drawing Sheets

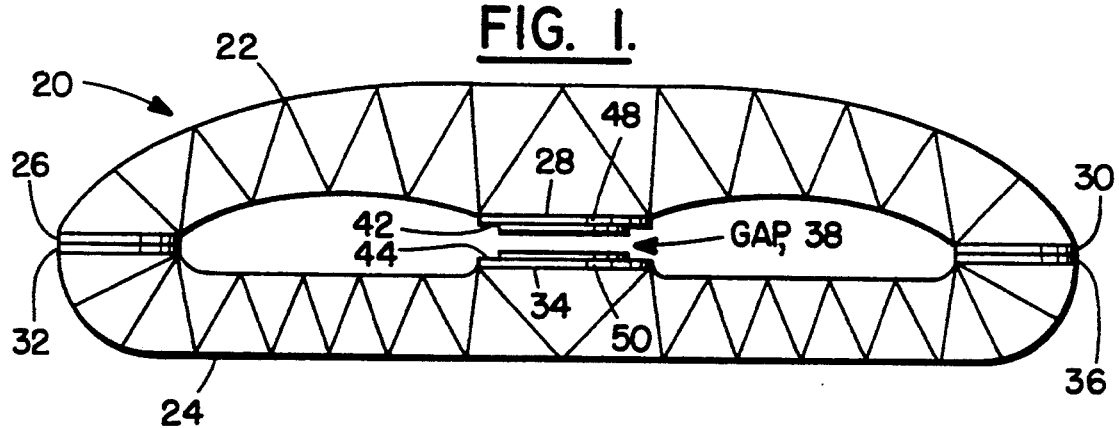
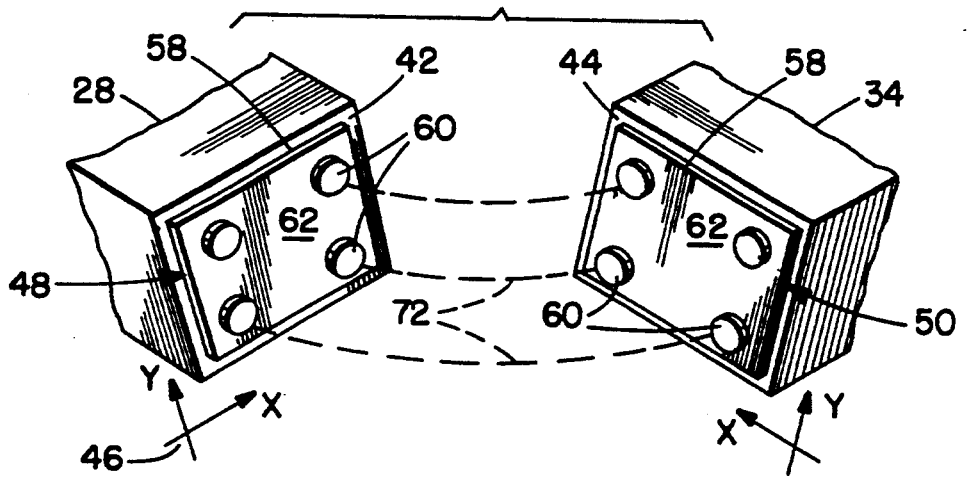
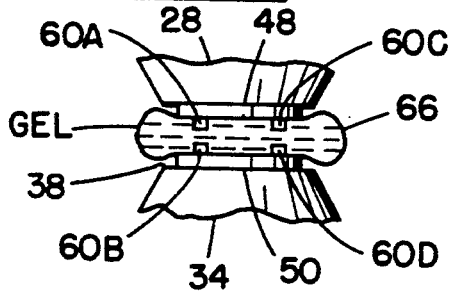
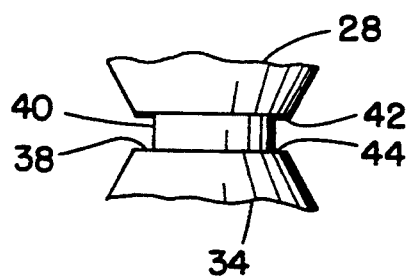
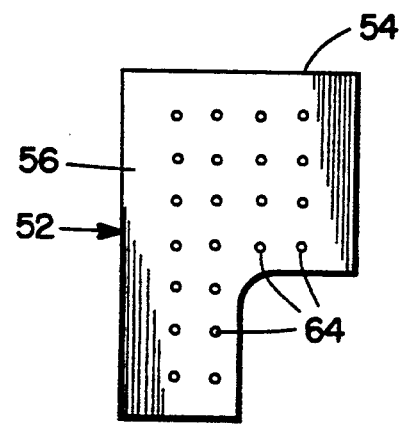

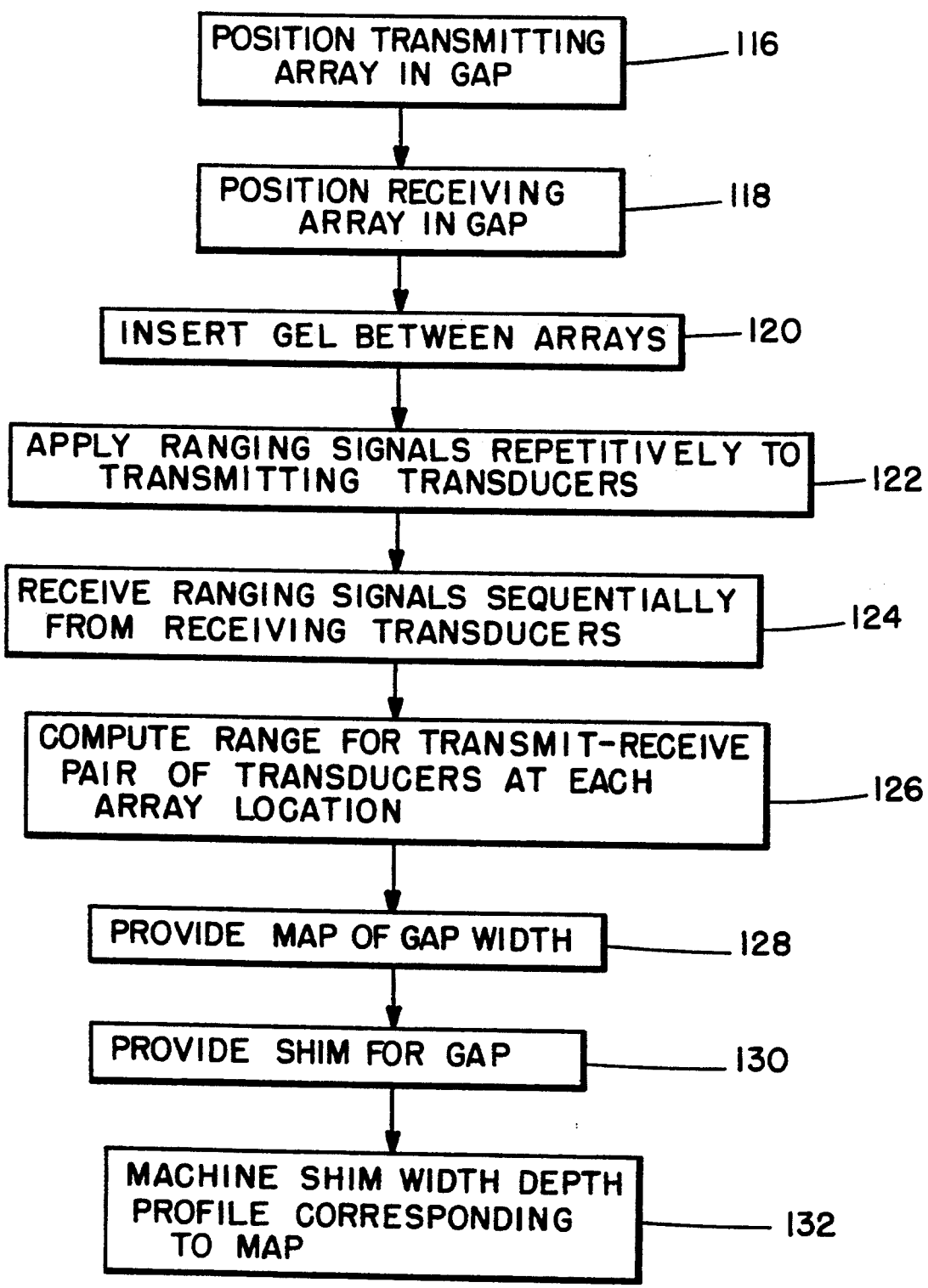

GAP MEASUREMENT FOR SHIM MANUFACTURE

BACKGROUND OF THE INVENTION

This invention relates to the measurement of a gap between two members of a mechanical structure, including a mapping of gap width along an interface between the two structural members, to enable manufacture of a shim for insertion between the two structural members while mating conformably to any undulations which may be present in interfacing surfaces of the gap.

Many forms of mechanical structure are manufactured by forming component parts of the structure followed by an assembly of the parts to produce the structure. During the assembling of the component parts, it may be necessary to introduce a shim between interfacing surfaces of the component parts. In some situations, such as in the construction of an aircraft wing, the interfacing surfaces may extend over several or more inches in each of two orthogonal dimensions. With such a wide area to be covered by the shim, it is to be anticipated that the shim may have to vary in thickness in order to match the configuration of the gap defined by the two interfacing surfaces.

A problem arises, particularly in the construction of the aircraft wing, that the configuration of the gap may vary as the component parts of the structure are being positioned, particularly in the situation wherein a number of persons are involved simultaneously in the positioning of the component parts. This may be caused by flexure or distension of the component parts. The result is a changing configuration of the gap between the interfacing surfaces. It is noted that a gap-measurement apparatus or process must not introduce any stresses in the mechanical structure as by changing the gap dimensions, for example, such as by pressing apart faces of the gap. A further problem arises in that the gap may be in a position which is substantially inaccessible to personnel assembling the component parts. Both of these problems introduce difficulties in the measurement of the gap, and necessitate an iterative process for forming a shim to fit the gap properly.

SUMMARY OF THE INVENTION

The aforementioned problems are overcome and other advantages are provided, in both method and apparatus aspects of the invention, by the use of flexible arrays of transducers which are mounted to the interfacing surfaces of the gap between the component parts being assembled to complete a mechanical structure. Each of the transducers provides for a conversion between electrical and acoustic energy so as to enable measurement of the gap by the generation of sonic ranging signals which propagate across the gap to provide a gap width measurement based on the time of propagation or flight of sonic signals across the gap. The transducers are constructed by depositing an array of electrodes on one side of a flexible, electrically-insulating, piezoelectric film. Each of the electrodes, which may be formed as a circular disc by photolithographic techniques cooperates with a ground-plane structure on the backside of the piezoelectric film to serve as a transducer which provides mechanical distension of the piezoelectric material in response to the generation of an electric field in the piezoelectric material. The acousto-electric conversion process is reversible such that the generation of mechanical distension, as by an incident sound wave, produces an electric field between the electrodes and the ground-plane structure.

Two of the foregoing arrays are constructed. One of the arrays is placed on a first of the interfacing surfaces to serve as a transmitting array for the transmission of an acoustic signal, and the second of the arrays is placed on the second of the interfacing surfaces to serve as a receiving array for reception of an acoustic signal. It is noted that, while the piezoelectric film is employed in a preferred embodiment of the invention, other forms of acousto-electric material suitable for construction of a transducer, such as magnetostrictive material, may be employed in the use of the invention, provided that the material is available in the form of a flexible film which can be placed conformably upon each of the interfacing surfaces. The conformal placement ensures that the film follows any undulations of the surface which may be present, and thereby ensures that measurements of gap width by the various transducers along each array of transducers provides data as to the gap width as a function of location along the gap in the two coordinate directions of the interfacing surfaces of the gap. Suitable electronic ranging circuitry, along with multiplexing circuitry coupled to the various transducers provides for the gap measurements to enable the production of a map of the gap setting forth the gap widths at numerous locations along the gap.

In carrying forth the methodology of the invention, it is convenient to secure the two arrays to their respective interfacing component surfaces by the use of an adhesive layer disposed on back surfaces of each of the transducer assemblies. The transducer assemblies are secured to the respective component interfacing surfaces prior to a bringing together of the two structural components, or members, of the mechanical structure which is being built. An acoustically transmissive gel is disposed between the two transducer arrays to provide an acoustic medium which allows for propagation of high-frequency sonic signals in the range of 1-8 megahertz (MHz). The resulting map has sufficient data to enable the machining of a shim to provide variations in thickness of the shim which correspond accurately to the variations in gap width. In order to insert the shim between the two structural members, the two structural members are separated from each other to allow extraction of the transducer arrays and the acoustically-transmissive gel. Thereupon, the shim is inserted between the structural members, and the two structural members are closed together upon the shim.

BRIEF DESCRIPTION OF THE DRAWING

The aforementioned aspects and other features of the invention are explained in the following description, taken in connection with the accompanying drawing wherein:

FIG. 1 is a stylized view of a mechanical structure having two structural members separated, in part, by a gap which is to be filled by a shim, in accordance with the practice of the invention, FIG. 1 also showing emplacement of two transducer assemblies on opposed surfaces of the gap;

FIG. 2 shows fragmentary views of the two structural members of FIG. 1 in the situation wherein the two members have been separated to open the gap to facilitate emplacement of the transducer assemblies on opposed surfaces of the gap;

FIG. 3 is a fragmentary view of the gap portion of the mechanical structure of FIG. 1, FIG. 3 showing emplacement of two transducer assemblies with an acoustically-transmissive gel therebetween;

FIG. 4 shows the same fragmentary view as FIG. 3, but with the transducer assemblies and the gel replaced by a shim;

FIG. 5 shows a gap footprint having a more complex form than that shown in FIG. 2, FIG. 5 also showing locations of transducer elements and of their electrode structures in a two-dimensional array;

FIG. 9 is a block diagram showing steps in the method of the invention.

DETAILED DESCRIPTION

Figure 6:
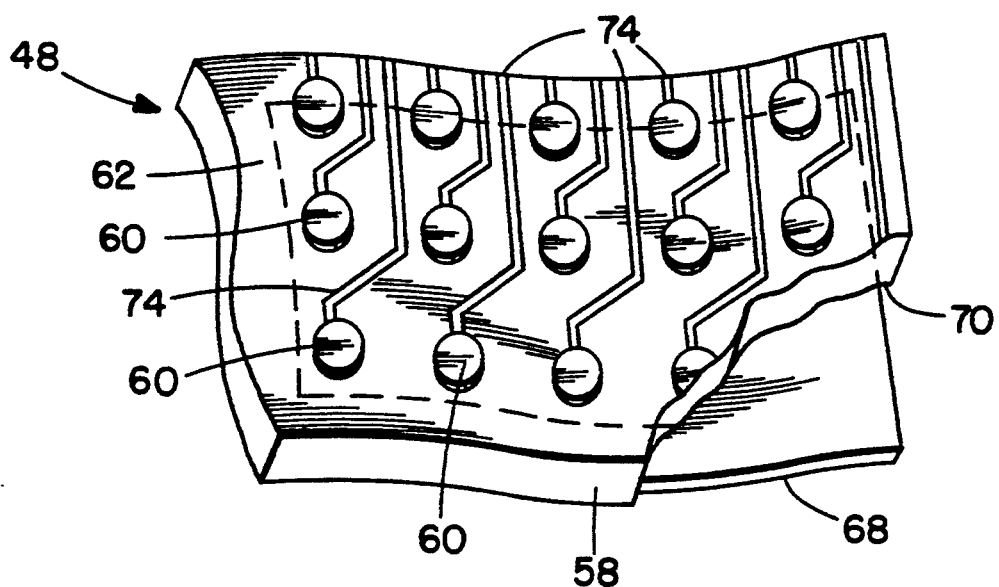
FIG. 6 is a stylized perspective view of a transducer assembly having electrodes and a ground plane disposed on opposite sides of a piezoelectric substrate, a portion of the substrate being cut away to show a ground-plane layer.

The apparatus of the invention for measuring the width of a gap between structural members of a mechanical structure applies to numerous forms of mechanical structures. In order to demonstrate use of the apparatus of the invention, it is convenient to show a relatively simple mechanical structure of two elongated structural members, or beams, which are to mate with each other by a series of plates. It is presumed that, for reasons of mechanical tolerance, or because of distension of one or both of the structural members, that a pair of the mounting plates do not contact each other. This leaves a gap between the pair of mounting plates. The gap must be filled with a shim for properly securing one structural member to the other structural member. An example of such a mechanical structure is shown in FIG. 1.

An advantage of the invention is that the gap measurement is accomplished by use of apparatus, namely, a pair of transducer assemblies to be described hereinafter, which does not affect the spacing between opposed surfaces of the gap, and which does not introduce any stresses in the mechanical structure containing the gap, and which therefore enables the manufacture of shims having the optimum thickness dimensions for filling a particular gap.

A further advantage of the invention is that, unlike current shim methods, it can be used to accomplish real time gap measurements of a mechanical structure while that structure is statically loaded to produce deformations and structural strains up to predetermined allowable design limits. By accomplishing the gap measurement under such conditions, the invention allows a determination to be made as to whether a shim is in fact required for a particular gap or, if required, the minimum shim thickness necessary for that gap. Those skilled in the art will appreciate that minimizing shim thickness is desirable in order to minimize the loads on shim fastener members.

With reference to FIGS. 1-4, there is shown a mechanical structure 20 comprising a first structural member 22 and a second structural member 24. The first structural member 22 is provided with three plates 26, 28, and 30, and the structural member 24 is provided with three plates 32, 34 and 36. The plates 26-36 provide for interconnection of the two structural members 22 and 24. The plate 26 mates with the plate 32, as shown in FIG. 1, and the plate 30 mates with the plate 36. However, the plate 28 which is intended to mate with the plate 34 is spaced apart from the plate 34 by a gap 38. In order to secure the plate 28 to the plate 34, a shim 40 (FIG. 4) must be placed between the plates 28 and 34. For a proper fit, the shim 40 must be machined such that the thickness of the shim 40 everywhere matches the width of the gap 38, including a matching of any undulation which may be present in the interfacing surfaces 42 and 44 of the plates 28 and 34, respectively, of the structural members 22 and 24.

In accordance with the invention, the machining of the shim 40 is to be accomplished by first preparing a map of the gap 38. As shown in FIG. 2, each of the interfacing surfaces 42 and 44 extend in two orthogonal directions represented by X-Y coordinate axes 46. Thus, the requisite map is a two-dimensional map of the gap 38. The map is prepared, in accordance with the invention, by measuring the width of the gap 38 at numerous locations between the interfacing surfaces 42 and 44 by use of a first transducer assembly 48 and a second transducer assembly 50 which are to be secured, respectively, to the interfacing surfaces 42 and 44 during the measurement process. At the conclusion of the measurement process, the shim 40 is manufactured, the transducer assemblies 48 and 50 are removed from the interfacing surfaces 42 and 44, and the shim 40 is inserted in the gap 38 contiguous to the interfacing surfaces 42 and 44. FIG. 1 shows placement of the transducer assemblies 48 and 50 on the respective surfaces 42 and 44 of the plates 28 and 34.

By way of example in the discussion of the mechanical structure 20, the structure 20 may have an overall length of 20 feet, and the center of the gap 38 may be symmetrically positioned 10 feet from either end of the structure 20. The gap 38 may have a nominal value of width in the range of 0.035-0.100 inch, by way of example. Each of the transducer assemblies 48 and 50 may have a thickness in the range of approximately 0.010-0.015 inch. By way of example, each of the interfacing surfaces 42 and 44 is shown as being rectangular; however, as shown in FIG. 5, the interfacing surfaces 42 and 44 may have some other shape, such as a square shape (not shown) or an irregular shape as shown by the configuration of footprint 52 of an interfacing surface, or of a corresponding transducer assembly. Edges of the interfacing surfaces may be as small as two inches, by way of example, or as long as 12 inches, by way of example. In the example of the footprint 52 of FIG. 5, the top edge 54 has a length of four inches, and the long edge 56 has a dimension of 7 inches.

In order to insert the transducer assemblies 48 and 50 into the gap 38, the structural members 22 and 24 are separated from each other, as shown in FIG. 2, to expose the interfacing surfaces 42 and 44 for receipt of the transducer assemblies 48 and 50. Thereupon, the structural members 22 and 24 are placed together so as to enable measurement of the gap 38 to be accomplished by use of the transducer assemblies 48 and 50. After completion of the measurement, the structural members 22 and 24 are separated from each other to facilitate removal of the transducer assemblies 48 and 50, and to facilitate emplacement of the shim 40 in its position. Thereupon, the structural members 22 and 24 are brought again into mating position, with the shim 40 serving to unite the plates 28 and 34 at the center of the structure 20.

FIG. 2 shows simplified views of the transducer assemblies 48 and 50, the view showing only a substrate 58 and electrodes 60 formed as circular discs and disposed on a front surface 62 of the substrate 58 in each of the transducer assemblies 48 and 50. In simplified FIG. 2, only four of the electrodes 60 are shown in each of the transducer assemblies 48 and 50, it being understood that many more of the electrodes 60 may be employed as in the footprint 52 of FIG. 5 which has an array of sites 64 for twenty two electrodes arranged in rows and columns. By way of example, the electrodes have a diameter of approximately 0.8 inch, and the sites 64 are spaced apart from each other by one inch. The electrodes 60, to be located at the sites 64 on FIG. 5, may have the circular shape shown in FIG. 2, or may be formed of some other convenient shape, such as an ellipse, a square or a rectangle (not shown). In the preferred embodiment of the invention, an acoustically transmissive material in the form of a gel 66 (FIG. 3) is disposed between, and contiguous to, the transducer assemblies 48 and 50 to provide for an acoustic transmission path of relatively low attenuation between the transducer assemblies 48 and 50. Due to the small spacing in the gap 38, it is preferred to operate the transducer assemblies 48 and 50 at a sonic frequency in the range of 1-8 MHz. For propagation of sound in a medium of air, the sonic wavelength at 8 MHz is less than 0.002 inch. The velocity of sound in the gel is nearly five times faster than in air, namely, approximately 1680 meters/second in the gel versus 345 meters/second in air. Thus, wavelength of the sound in the gel is approximately five times longer than in air. It is difficult to couple sonic energy from relatively dense, incompressible piezoelectric material of a transducer into a low-density compressible material such as air without an extensive impedance matching structure which would complicate the transducer configuration. Poor coupling of the sonic energy would attenuate the received signal excessively for successful operation of the transducer assemblies 48 and 50 in the gap 38. However, coupling of sound into the gel 66 is far superior to the coupling of sound into air, so that there is adequate signal strength for use of the transducer assemblies 48 and 50 in the gap 38. A suitable gel is produced by Parker Laboratories under the name of AQUASONIC 100 gel.

FIG. 6 shows a more detailed view of the construction of the first transducer assembly 48 wherein the substrate 58 supports an array of spaced-apart circular electrodes 60 disposed in an array of rows and columns upon the front surface 62 of the substrate 58. The transducer assembly 48 further comprises an electrode structure in the form of a metallic layer 68 which is disposed on a back surface 70 of the substrate 58 and serves as the ground plane. Each of the electrodes 60 is also formed of electrically conductive material, a metal such as aluminum or tin being employed for both the electrodes 60 and the ground-plane layer 68 in the preferred embodiment of the invention. Both of the transducer assemblies 48 and 50 have the same form of construction and, accordingly, the description of the construction of the transducer assembly 48 applies also to the construction of the transducer assembly 50.

The array of the electrodes 60 may provide equal spacing among all of the electrodes 60 or, if desired, the spacing may vary with a more dense spacing in some parts of the array and a less dense spacing (not shown) in another part or parts of the array. The array of electrodes, or of transducers, may be a regular array, as described above for FIG. 5, or may be an irregular array or asymmetrical array or even a random array, if desired. In all cases, it is important that the array of electrodes 60 on the first transducer assembly 48 be a mirror image of the array of electrodes 60 of the second transducer assembly 50, as shown by the dashed lines 72 in FIG. 2. Thereby, each electrode of the assembly 48 is located directly across the gap 38 from the corresponding electrode 60 of the assembly 50. This is demonstrated by four electrodes in FIG. 3 wherein an electrode 60A of the transducer assembly 48 is located directly across the gap 38 from the electrode 60B of the transducer assembly 50, and an electrode 60C of the transducer assembly 48 is located directly across the gap 38 from an electrode 60D of the transducer assembly 50. In FIG. 6, electrically-conductive leads 74 disposed on the front surface 62 of the substrate 58 provide conduction of electrical signals between external electrical circuitry (not shown in FIG. 6) as will be described with reference to FIG. 8. The leads 74 are constructed of electrically-conductive material, a metal such as aluminum or tin being employed in the preferred embodiment of the invention.

The substrate 58 is formed of acousto-electric material which provides for a conversion between electric energy and acoustic energy. The material is operative in either direction so as to provide for the conversion either from electric to acoustic energy, or from acoustic to electric energy. Thereby, either one of the transducer assemblies 48 and 50 can serve as a transmitter or a receiver of sonic energy in the gap 38. It is desirable to employ a material for the substrate 58 which exists in the form of a flexible film, thereby to allow the transducer assembly 48 or 50 to flex and to follow any undulations which may be present in the interfacing surfaces 42 and 44 of the mechanical structure 20. In addition, the material of the substrate 48 should be electrically insulating so as to provide electrical insulation between the electrodes 60, as well as between an electrode 60 and the ground-plane layer 68. One suitable material for the substrate 58 is polyvinylidene fluoride which has the form of a polymer and is constructed as a film having a thickness of approximately 0.003 inch. The material is piezoelectric and provides for a conversion of electric to sonic energy, and from sonic to electric energy. The material may be referred to as PVDF, and is manufactured by ATOCHEM SENSORS INC. of Valley Forge, Pa. The electrodes 60 and the ground-plane layer 68 may be constructed each with a thickness of 0.001 inch to give a total thickness to the transducer 48 (FIG. 6) of 0.005 inch.

The PVDF film material for the substrate 58, in combination with the electrodes 60, the leads 74 and the ground-plane layer 68 is sufficiently flexible to follow any undulations which may be present in the interfacing surfaces 42 and 44 of the plates 28 and 34. Also, the PVDF film is a suitable substrate for photolithography whereby the electrodes 60, the leads 74 and the ground-plane layer 68 can be deposited on the substrate 58 by means of photolithography. This provides convenience in manufacture of the transducer assembly 48, and allows such transducer assemblies to be readily fabricated in large numbers by suitable photolithographic apparatus. In FIG. 6, each electrode 60, in combination with the piezoelectric substrate 58 and the ground-plane layer 68 constitutes a single transducer element. By virtue of the individual leads 74 connecting with respective ones of the electrodes 60, each transducer element can be individually energized independently of energization of any of the other transducer elements, or the transducer elements can be energized simultaneously, as may be desired. Similarly, upon reception of sonic signals, a signal can be received by any one of the transducer elements independently of the operation of any other one of the transducer elements. In the ensuing description, the first transducer assembly 48 is to be employed for transmission of sonic signals, and the second transducer assembly 50 is to be employed for reception of sonic signals.

It is noted that the relatively wide extent of the interfacing surfaces 42 and 44, and the relatively narrow dimensions of the gap 38 constitute an electrical capacitor wherein the plates 28 and 34, which are constructed of metal, serve as the plates of an electrical capacitor. Thus, the electrical signals employed in activating the transmitting transducer assembly 48 can propagate via this capacitor across the gap 38 to be received as electrical signals via external circuitry connected to the receiving transducer assembly 50. Such transmission of electric signals across the gap 38 may interfere with the reception of sonic signals which are also transmitted across the gap 38. The interference can be negated by the structure of FIG. 7.

Figure 7:
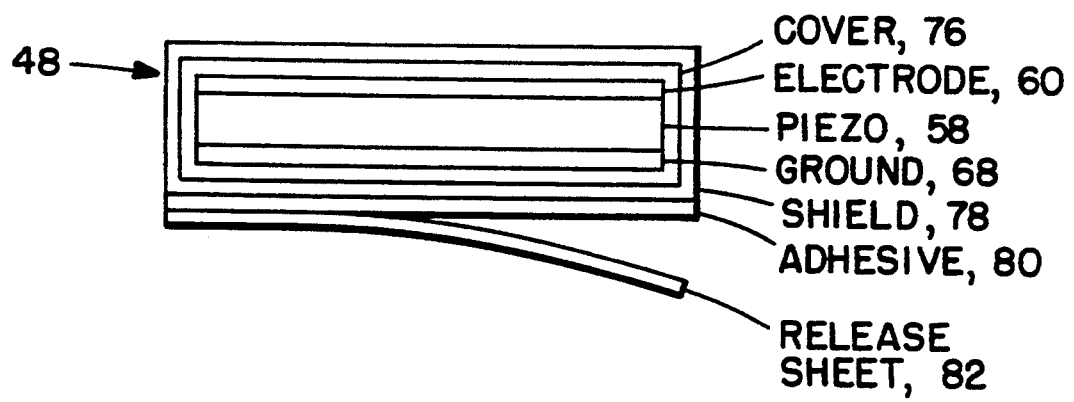
FIG. 7 is an elevational sectional view, shown diagrammatically, of a transducer assembly.

FIG. 7 shows further details in the construction of the transducer assembly 48, this description applying also to the transducer assembly 50. The diagrammatic representation of a cross section of the transducer assembly 48 of FIG. 7 shows the substrate of piezoelectric material, 58, disposed between a layer of electrodes 60 and the ground-plane layer 68. These three components of the transducer assembly 48 are, in turn, surrounded by a cover 76 of electrically insulating material. The cover 76 is surrounded by an electrically conductive shield 78. The cover 76 is formed as a layer of material such as a fluoridated hydrocarbon polymer, a portion of the cover being formed as a layer along the front of the transducer assembly, and a portion of the cover being formed as a layer along the back of the transducer assembly. In the preferred embodiment of the invention, the cover 76 comprises a film of mylar having a thickness of 0.002 inch. The shield 78 is formed of a layer of copper, in the preferred embodiment of the invention, the copper having a thickness of 0.003 inch. The cover 76 insulates the layer of electrodes 60 and the ground-plane layer 68 from the shield 78 so that any currents which may be present in the electrodes 60 and the ground-plane layer 68 are not conducted into the shield 78. The shield 78 has proven effective in attenuating transmission of electric signals, via displacement current, across the capacitor formed by the plates 28 and 34. This greatly enhances the reception of sonic signals.

Also shown in FIG. 7 is an adhesive layer 80 disposed along the backside of the transducer assembly 48, and a release sheet 82 which covers the adhesive layer 80 prior to installation of the transducer assembly 48 in the gap 38. Upon installation of the transducer assembly 48 upon the plate 28, the release sheet 82 is stripped off of the layer 80 to expose the adhesive, thereby to secure the transducer assembly 48 to the plate 28. The assembly 50 also is provided with an adhesive layer 80 and a release sheet 82 to facilitate installation of the transducer assembly 50 upon the plate 34. It is noted also that a simplification may be made, if desired, in the construction of the receiving transducer assembly 50 by eliminating the shield 78 in the case wherein the shielding of the transmitting transducer assembly 48 suffices to remove essentially all of the displacement current. The cover 76 would be retained in the assembly 50 to provide electrical insulation between the electrodes 60 and the gel 66.

Figure 8:
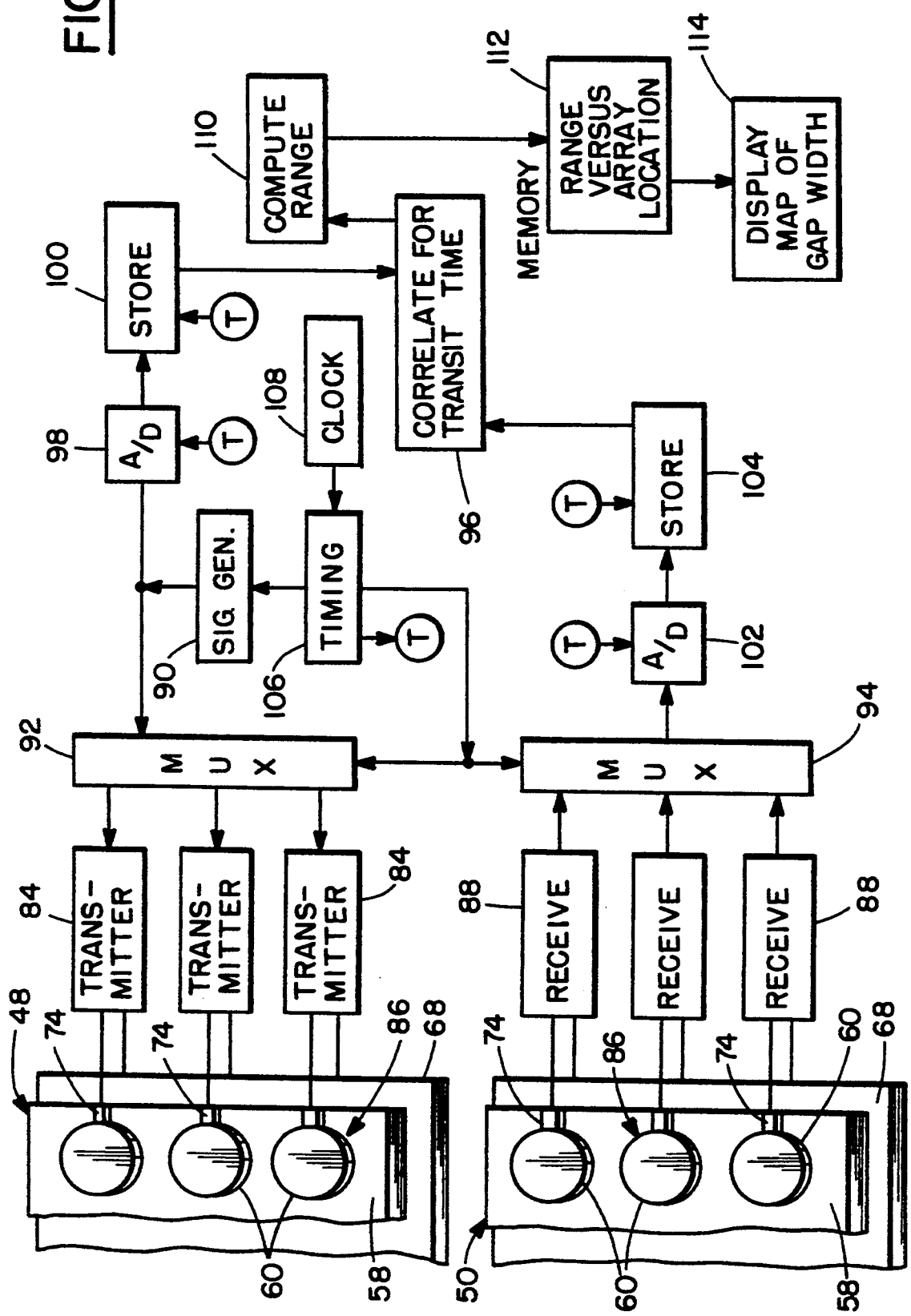
FIG. 8 is a block diagram of circuitry utilized in operating a transmitting transducer array and a receiving transducer array for measuring gap width.

FIG. 8 shows connection of electrical circuitry to the array of transducer elements of the transmitting transducer assembly 48 and of the receiving transducer assembly 50. Suitable transmitting circuitry is represented by transmitters 84 connected to respective ones of the transducer elements 86 wherein each transducer element 86 comprises an electrode 60 in combination with the ground plane layer 68 and the piezoelectric material of the substrate 58. Each transmitter 84 is connected between the ground-plane layer 68 and a lead 74. Similarly, suitable circuitry for receiving sonic signals converted to electric signals via the transducer elements 86 of the receiving transducer assembly 50 is provided by a set of receivers 88 connected to respective ones of the transducer elements 86 of the receiving transducer array 50. Each receiver 88 is connected between the ground-plane layer 68 and a lead 74. Also included in the circuitry of FIG. 8 is a signal generator 90 which is coupled via a multiplexer 92 to input terminals of the transmitters 84. Signals received by the receivers 88 are outputted via a multiplexer 94.

The generator 90 produces a signal at the desired signal frequency in the range of 1–8 MHz. This signal may be a single half cycle of a sinusoid, or a pulse-modulated sinusoid comprising several or more cycles of sinusoid at the carrier frequency of 1–8 MHz. Alternatively, if desired, the signal may extend over hundreds of cycles and include a pulse or frequency modulation having a bandwidth sufficiently large to measure the width of the gap 38. Such signals, which may be referred to as ranging signals, may be processed in accordance with well-known principles of radar and sonar whereby a receiver is constructed in accordance with the form of signal being transmitted. For example, if a single pulse is transmitted, then the received pulse is detected, and the elapsed time from transmission to reception is noted. If a more complex form of signals, such as the aforementioned phase or frequency modulated signal is employed, then a sample of the transmitted signal is correlated with the received signal to determine the time of reception of the received signal, thereby to determine the transit time for propagating across the gap 38. In general, a correlation form of receiver can be used also for a single pulse, if desired. Accordingly, in order to show the most general case of signal reception for determining the transit time, a correlation unit 96 is shown in FIG. 8.

The correlation unit 96 operates in digital fashion with digitized samples of the transmitted and received signals. Accordingly, the signal outputted by the generator 90 is converted from analog to digital form by a converter 98 and stored within a storage unit 100. Similarly, signals received via the multiplexer 94 are converted from analog to digital format by a converter 102 and stored in a storage unit 104. A timing unit 106 is driven by a clock 108 and outputs timing signals which synchronize operation of the signal generator 90 with operation of the correlation unit 96. Other timing signals, indicated by way of example at terminal T, are applied for operation of the converters 98 and 102 as well as the storage units 100 and 104. The converters 98 and 102 act as samplers of the analog signals to provide digitized samples of the analog signals. The correlation unit 96 operates with the stored reference of the transmitted signal and the stored receive signal to correlate the two signals, thereby to determine the time elapsed between transmission and reception of the sonic signals transmitted between transducer elements 86 of the assemblies 48 and 50.

In order to create a map of the width of the gap 38, data is required for each pair of transducer elements, such as the pair of transducer elements represented by the electrodes 60A-B and 60C-D of FIG. 3. This is readily accomplished by use of the multiplexers 92 and 94 under command of signals from the timing unit 106. In accordance with a first procedure, the multiplexers 92 and 94 initially select a first pair of transducer elements 86 for measurement of transit time of a sonic signal across the gap 38. Alternatively, in accordance with a second procedure, the multiplexer 92 may be bypassed to provide for generation of sonic signals simultaneously from all of the transducer elements 86 of the first transducer assembly 48 for measurement of transit time by an individual one of the transducer elements 86 of the second transducer assembly 50. The generation of the sonic signals simultaneously from all of the transducer elements 86 of the first transducer assembly 48 is repeated for the transit-time measurements performed subsequently with each of the transducer elements 86 of the second transducer assembly 50.

With each of the foregoing procedures, the result of each transit-time measurement is applied to a computer 110 which subtracts propagation delays through the cover 76 (FIG. 7) from the transit-time measurement and makes other calibration corrections based on initial calibrations of the transducer assemblies 48 and 50. The resulting adjusted, or corrected, time of flight of the sonic signal is then converted to a range, or gap-width, measurement, and is stored in a memory 112 as a function of the location of the pair of transducer elements in terms of the X-Y coordinate axes 46 (FIG. 2). Thereupon, the timing unit 106 operates the multiplexers 92 and 94 to provide for a gap-width measurement between a second pair of transducer elements 86 to provide for range data at another location in the array of transducer elements, this data also being stored in the memory 112. The procedure continues until range measurements have been attained from all of the pairs of transducer elements 86. Thereupon, the data stored in the memory 112 is outputted by a display 114 as a map of the gap width. The gap-width data is employed by a milling machine (not shown) to mill the shim 40 (FIG. 4) in accordance with the X-Y coordinate axes 46 to provide shim thickness equal to the gap width measurement at each reference point of the map. By way of example, with reference to the footprint 52 of the gap as shown in FIG. 5, the shim 40 would have values of depth specifically designated at each of the twenty-two sites 64, thereby to follow any undulations which may be present in the interfacing surfaces 42 and 44 of the gap 38.

FIG. 9 shows a sequence of steps in carrying out the method of the invention. The sequence begins at block 116 wherein a transmitting array of transducer elements is positioned in the gap by securing the transducer assembly 48 to the plate 28. Then, at block 118, a receiving array of transducer elements is positioned in the gap by securing the transducer assembly 50 to the plate 34. Then, at block 120, the acoustically-transmissive gel 66 is located between the transmitting and receiving arrays of transducer elements.

The procedure continues at block 122 wherein ranging signals are applied sequentially, or simultaneously, to each of the transmitting transducer elements. The transmitting transducer elements convert the electric ranging signals to sonic ranging signals. The sonic ranging signals are received by the receiving transducer elements and are converted to electric ranging signals. At block 124, the ranging signals are received sequentially from the various receiving transducer elements. The sequencing of the various pairs of transducer elements 86 is accomplished by use of the multiplexers 92 and 94. At block 126, the range determination is made for each pair of transducer elements based on the measured time of reception. Such measurement may be made, as shown in FIG. 8, by use of the correlation unit 96 with further calibration being made by the computer 110 to ensure that delays in the circuits of the transmitters 84 and the receivers 88, as well as other factors such as propagation delays in the cover 76, have been accounted for. The resulting measurements are used to provide a map of the gap width at block 128. Thereupon, at block 130, the shim 40 is provided for the gap 38 and, at block 132, the shim is machined to provide the appropriate depth profile corresponding to the map of the gap width.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. Apparatus for measuring a gap between a first structural member and a second structural member of a mechanical structure, said gap being defined by a first interfacing surface of said first structural member and a second interfacing surface of said second structural member, comprising:

first transducer means, removably secured to said first interfacing surface, for transmitting at least one acoustic ranging signal across said gap, said first transducer means comprising a first piezoelectric film having a first front surface and a first back surface, said first front surface facing said second interfacing surface, said first back surface facing said first interfacing surface, a first array of electrodes disposed on said first front surface, each electrode of said first array of electrodes being disposed at an associated transmitting coordinate position of said first transducer means, and a first electrode structure disposed on said first back surface;

second transducer means, removably secured to said second interfacing surface, for receiving said at least one transmitted acoustic ranging signal, said second transducer means comprising a second piezoelectric film having a second front surface and a second back surface, said second front surface facing said first interfacing surface, said second back surface facing said second interfacing surface, a second array of electrodes disposed on said second front surface, said second array of electrodes being disposed as a mirror image of said first array of electrodes, each electrode of said second array of electrodes facing a corresponding electrode of said first array of electrodes, each said electrode of said second array of electrodes being disposed at an associated receiving coordinate position of said second transducer means corresponding to said transmitting coordinate position of said corresponding electrode of said first array of electrodes, and a second electrode structure disposed on said second back surface;

an acoustically transmissive medium disposed between said first and second transducer means;

means, connected to said first and second arrays of electrodes, for determining a transit time for each of said at least one acoustic ranging signals transmitted across said gap, said means for determining said transit time outputting an output signal representative of said transit time for each said determined transit time;

means, connected to said means for determining said transit time, for receiving each said output signal, said means for receiving each said output signal determining a gap width measurement for each said received output signal, said means for receiving each said output signal outputting a gap width measurement signal for each said determined gap width measurement; and, means, connected to said means for receiving each said output signal, for receiving each said gap width measurement signal, said means for receiving each said gap width measurement signal storing each said received gap width measurement signal in association with one of said transmitting coordinate positions of said electrodes of said first array of electrodes.

2. Apparatus according to claim 1 wherein said acoustically transmissive medium is a gel.

3. Apparatus according to claim 1 wherein said first piezoelectric film and said second piezoelectric film are each a flexible and electrically-insulating film substrate for supporting respectively said first and second arrays of electrodes, said electrodes of said first and second arrays being spaced-apart from each other in said first and second arrays respectively.

4. Apparatus according to claim 3 wherein said first piezoelectric film and said second piezoelectric film each comprises polyvinylidene fluoride polymer.

5. Apparatus according to claim 1 wherein each of said electrodes of said first array of electrodes in cooperation with said first piezoelectric film and with said first electrode structure defines a transmitting transducer element for a conversion of electrical energy to acoustic energy;

each of said electrodes of said second array of electrodes in cooperation with said second piezoelectric film and with said second electrode structure defines a receiving transducer element associated with a transmitting transducer element for a conversion of acoustic energy to electrical energy; and, said means for determining said transit time for said each of said at least one transmitted acoustic signals comprises electronic ranging circuitry connected to said electrodes of said first array of electrodes for activating at least one of said transmitting transducer elements, whereby said at least one acoustic signal is transmitted across said gap, said electronic ranging circuitry being further connected to said electrodes of said second array of electrodes, whereby reception of each of said at least one transmitted acoustic signals is detected.

6. Apparatus according to claim 5 wherein said electronic ranging circuitry comprises:

first multiplexing means connected to said electrodes of said first array of electrodes for activating each said transmitting transducer element; and, second multiplexing means connected to said electrodes of said second array of electrodes for scanning each receiving transducer element synchronously with said activation of said transmitting transducer element associated with said receiving transducer element by said first multiplexing means.

7. Apparatus according to claim 1 wherein each electrode of said first array of electrodes and of said second array of electrodes comprises a disc.

8. Apparatus according to claim 7, wherein the disc of each of said electrodes has a circular shape, and wherein further each of said transmitting coordinate positions of said electrodes of said first array of electrodes, and each of said associated receiving coordinate positions of said electrodes of said second array of electrodes is located at a corresponding intersection site of an X-Y coordinate axes grid representative of said first and second interfacing surfaces.

9. Apparatus according to claim 1 wherein said first electrode structure comprises a first ground plane, and wherein further said second electrode structure comprises a second ground plane.

10. Apparatus according to claim 1 further comprising:

a first electrically insulating cover layer surrounding said first piezoelectric film and said electrodes of said first array of electrodes disposed thereon and said first electrode structure;

a first electrically conductive shield layer surrounding said first cover layer;

a second electrically insulating cover layer surrounding said second piezoelectric film and said electrodes of said second array of electrodes disposed thereon and said second electrode structure; and, a second electrically conductive shield layer surrounding said second cover layer.

11. Apparatus according to claim 10 wherein said first cover layer and said second cover layer each comprises a polyfluorinated hydrocarbon, and wherein further said first shield layer and said second shield layer each comprises copper.

12. Apparatus according to claim 1 further comprising first adhesive means for securing said first transducer means to said first interfacing surface of said first structural member, and second adhesive means for securing said second transducer means to said second interfacing surface of said second structural member.

13. Apparatus according to claim 12 wherein each of said first and said second adhesive means comprises a layer of adhesive.

14. A method of measuring a gap between a first structural member and a second structural member of a mechanical structure, said gap being defined by a first interfacing surface of said first structural member and a second interfacing surface of said structural member, comprising the steps of:

removably securing a transmitting transducer assembly to said first interfacing surface, said transmitting transducer assembly transmitting at least one acoustic ranging signal across said gap upon an activation of said transmitting transducer assembly, said transmitting transducer assembly comprising a first piezoelectric film having a first front surface and a first back surface, said first front surface facing said second interfacing surface, said first back surface facing said first interfacing surface, a first array of electrodes disposed on said first front surface, each electrode of said first array of electrodes being disposed at an associated transmitting coordinate position of said transmitting transducer assembly, and a first electrode structure disposed on said first back surface;

removably securing a receiving transducer assembly to said second interfacing surface, said receiving transducer assembly receiving each of said at least one acoustic ranging signals transmitted across said gap, said receiving transducer assembly comprising a second piezoelectric film having a second front surface and a second back surface, said second front surface facing said first interfacing surface, said second back surface facing said second interfacing surface, a second array of electrodes disposed on said second front surface, said second array of electrodes being disposed as a mirror image of said first array of electrodes, each electrode of said second array of electrodes facing a corresponding electrode of said first array of electrodes, each said electrode of said second array of electrodes being disposed at an associated receiving coordinate position of said receiving transducer assembly corresponding to said transmitting coordinate position of said corresponding electrode of said first array of electrodes, and a second electrode structure disposed on said second back surface;

disposing an acoustically transmissive medium between said transmitting transducer assembly and said receiving transducer assembly;

activating said transmitting transducer assembly with at least one electrical ranging signal, whereby said at least one acoustic ranging signal is transmitted across said gap;

receiving said at least one acoustic ranging signal at said receiving transducer assembly;

determining a transit time for each of said transmitted acoustic ranging signals received at said receiving transducer assembly, each said transit time being representative of a time interval between activation of said transmitting transducer assembly to transmit each said acoustic ranging signal and reception of said each said acoustic ranging signal at said receiving transducer assembly;

determining a gap width measurement distance for each said determined transit time; and, storing each said determined gap width measurement distance in association with one of said transmitting coordinate positions of said electrodes of said first array of electrodes, whereby a map of said gap width measurement distance is obtained and said gap is measured.

15. A method according to claim 14, wherein:

said method of measuring said gap is a measuring method for the manufacture of a shim for insertion into said gap; and, said method further comprises a step of machining a shim blank to provide a thickness profile of said machined shim conforming to said map of said gap width measurement distance, said machined shim having a thickness at each shim location corresponding to a respective one of said transmitting coordinate positions which is equal to said gap width measurement distance associated with said respective one of said transmitting coordinate positions.

16. A method according to claim 15 further comprising the steps of:

removing said transmitting and receiving transducer assemblies from said first and second interfacing surfaces, respectively; and inserting said machined shim into said gap subsequent to said removing step.

17. A method according to claim 14 wherein said electrodes of said first and second array of electrodes are disposed on said first and second transducer assemblies, respectively, by photolithography.

18. A method according to claim 14 wherein said accoustically transmissive medium is a gel disposed between said transmitting transducer assembly and said receiving transducer assembly.

19. A method according to claim 18, wherein:

said method of measuring said gap is a measuring method for the manufacture of a shim for insertion into said gap; and, said method further comprises a step of machining a shim blank to provide a thickness profile of said shim conforming to said map of said gap width measurement distance, said machined shim having a thickness at each shim location corresponding to a respective one of said transmitting coordinate positions which is equal to said gap width measurement distance associated with said respective one of said transmitting coordinate positions.

20. A method according to claim 19, further comprising the steps of:

removing said gel from said gap;

removing said transmitting and receiving transducer assemblies from said first and second interfacing surface, respectively; and, inserting said machined shim into said gap subsequent to said removing steps.

21. A method according to claim 14, wherein said first and second piezoelectric films each comprise polyvinylidene fluoride polymer.

22. A method according to claim 14, wherein said electrodes of said first and second arrays of electrodes each have a shape of a disc.

23. A method according to claim 14, wherein each of said transmitting coordinate positions of said electrodes of said first array of electrodes, and each of said associated receiving coordinate positions of said electrodes of said second array of electrodes, is located at a corresponding intersection site of an X-Y coordinate axes grid representative of said first and second interfacing surfaces.

24. A method according to claim 14, wherein said first electrode structure comprises a first ground plane, and wherein further said second electrode structure comprises a second ground plane.

25. A method according to claim 14, wherein:

said transmitting transducer assembly further comprises a first electrically insulating cover layer surrounding said first piezoelectric film, said electrodes of said first array of electrodes, and said first electrode structure, and a first electrically conductive shield layer surrounding said first cover layer; and, said receiving transducer assembly further comprises a second electrically insulating cover layer surrounding said second piezoelectric film, said electrodes of said second array of electrodes, and said second electrode structure, and a second electrically conductive shield layer surrounding said second cover layer.

26. A method according to claim 14, wherein:

said transmitting transducer assembly further comprises a first adhesive layer removably securing said transmitting transducer assembly to said first interfacing surface; and, said receiving transducer assembly further comprises a second adhesive layer removably securing said receiving transducer assembly to said second interfacing surface.

* * * * *